US009258279B1

(12) United States Patent
Rajkumar et al.

(10) Patent No.: US 9,258,279 B1
(45) Date of Patent: Feb. 9, 2016

(54) BOOKMARKING CONTENT FOR USERS ASSOCIATED WITH MULTIPLE DEVICES

(71) Applicant: Google Inc., Mountain View, CA (US)

(72) Inventors: Nareshkumar Rajkumar, San Jose, CA (US); Vinod Kumar Ramachandran, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 419 days.

(21) Appl. No.: 13/756,345

(22) Filed: Jan. 31, 2013

Related U.S. Application Data

(63) Continuation-in-part of application No. 13/458,124, filed on Apr. 27, 2012, now Pat. No. 8,688,984.

(51) Int. Cl.
*H04L 29/06* (2006.01)
*G06F 17/22* (2006.01)
*H04L 9/08* (2006.01)

(52) U.S. Cl.
CPC ........ *H04L 63/0421* (2013.01); *G06F 17/2205* (2013.01); *H04L 9/0841* (2013.01); *H04L 9/0866* (2013.01)

(58) Field of Classification Search
CPC ....... H04L 2209/42; H04L 9/00; H04L 9/006; H04L 9/08; H04L 9/0816; H04L 9/0819; H04L 9/0825; H04L 9/0827; H04L 9/083; H04L 9/0833; H04L 9/0838; H04L 9/0841; H04L 9/0861; H04L 9/0866; H04L 9/0869; H04L 9/0891; H04L 9/0894; H04L 9/32; H04L 9/321; H04L 63/04; H04L 63/0407; H04L 63/0421; H04L 63/065; H04L 63/10; H04L 63/104; G06F 21/00; G06F 21/10; G06F 21/30; G06F 21/50; G06F 21/60; G06F 21/62; G06F 21/6245; G06F 21/6254; G06F 21/6272; G06F 2221/2129
See application file for complete search history.

(56) References Cited

U.S. PATENT DOCUMENTS 5,408,950 A 4/1995 Porto
5,892,900 A 4/1999 Ginter et al.
(Continued)

FOREIGN PATENT DOCUMENTS

EP 2270741 A1 1/2011
JP 2004070441 A 3/2004
(Continued)

OTHER PUBLICATIONS

International Search Report and Written Opinion for Application No. PCT/US2013/029384, dated Jun. 17, 2013, 12 pages.
Ebbert, J., "Is Audience Buying Possible in Mobile Advertising?," AdExchanger.com, Aug. 3, 2011 [online] [Retrieved on Dec. 2, 2011]; Retrieved from the Internet URL: http://www.adexchanger.com/mobile/audience-buying/; 9 pages.
(Continued)

*Primary Examiner* — Eric W Sheppered
(74) *Attorney, Agent, or Firm* — Fish & Richardson P.C.

(57) ABSTRACT

Methods, systems, and apparatus include computer programs encoded on a computer-readable storage medium, including a method for providing content. The method includes anonymously linking at least two different identifiers associated with two different requesting sources. The linking uses an identifier that does not include any personally identifiable information. A request is received from a user to create a bookmark for a resource that was presented on a first device having an associated first identifier. The bookmark or a reference to the bookmark is stored. Bookmarks associated with the user are synched across multiple requesting sources using the anonymous linking. After synching, a request to access saved bookmarks is received from a user when accessing a second different device. Based at least in part on the synched bookmarks, the bookmark is provided, or a link to the bookmark is provided, enabling presentation of a resource associated with the bookmark.

20 Claims, 12 Drawing Sheets

(56) References Cited

U.S. PATENT DOCUMENTS

| | | |
|---|---|---|
| 6,223,178 B1 | 4/2001 | Himmel et al. |
| 6,324,566 B1 | 11/2001 | Himmel et al. |
| 6,486,891 B1 | 11/2002 | Rice |
| 7,308,261 B2 | 12/2007 | Henderson et al. |
| 7,551,913 B1 | 6/2009 | Chien |
| 7,711,707 B2 | 5/2010 | Kelley et al. |
| 7,729,977 B2 | 6/2010 | Xiao et al. |
| 7,778,422 B2* | 8/2010 | Freeman et al. ............ 380/278 |
| 7,861,260 B2 | 12/2010 | Shkedi |
| 8,041,602 B2 | 10/2011 | Haley et al. |
| 8,065,185 B2 | 11/2011 | Foladare et al. |
| 8,107,408 B2 | 1/2012 | Chindapol et al. |
| 8,140,389 B2 | 3/2012 | Altberg et al. |
| 8,271,328 B1 | 9/2012 | Baltz et al. |
| 8,321,684 B2 | 11/2012 | Mumm et al. |
| 8,359,274 B2 | 1/2013 | Yoder et al. |
| 8,423,408 B1 | 4/2013 | Barnes et al. |
| 8,438,184 B1 | 5/2013 | Wang et al. |
| 8,666,812 B1 | 3/2014 | Gandhi |
| 8,688,984 B2 | 4/2014 | Rajkumar et al. |
| 8,799,456 B2 | 8/2014 | de Jager et al. |
| 8,832,319 B2* | 9/2014 | Kessel et al. ............ 709/248 |
| 8,862,889 B2 | 10/2014 | Madden |
| 8,892,685 B1 | 11/2014 | Rajkumar et al. |
| 8,966,043 B2 | 2/2015 | Rajkumar et al. |
| 8,978,158 B2 | 3/2015 | Rajkumar et al. |
| 9,009,258 B2 | 4/2015 | Ramachandran et al. |
| 9,087,335 B2 | 7/2015 | Rane et al. |
| 2003/0046290 A1* | 3/2003 | Yamada ............ 707/10 |
| 2003/0061275 A1 | 3/2003 | Brown et al. |
| 2003/0061512 A1 | 3/2003 | Flurry et al. |
| 2003/0149781 A1 | 8/2003 | Yared et al. |
| 2003/0217687 A1 | 11/2003 | Segall |
| 2003/0229900 A1 | 12/2003 | Reisman |
| 2004/0068477 A1 | 4/2004 | Gilmour et al. |
| 2004/0088363 A1 | 5/2004 | Doemling et al. |
| 2004/0122735 A1 | 6/2004 | Meshkin |
| 2004/0204997 A1 | 10/2004 | Blaser et al. |
| 2005/0021747 A1 | 1/2005 | Jave |
| 2005/0044423 A1 | 2/2005 | Mellmer et al. |
| 2005/0076248 A1 | 4/2005 | Cahill et al. |
| 2005/0268102 A1 | 12/2005 | Downey |
| 2005/0278731 A1 | 12/2005 | Cameron et al. |
| 2006/0020782 A1 | 1/2006 | Kakii |
| 2006/0036857 A1 | 2/2006 | Hwang |
| 2006/0080415 A1 | 4/2006 | Tu |
| 2006/0101287 A1 | 5/2006 | Morten |
| 2006/0136717 A1 | 6/2006 | Buer et al. |
| 2007/0124201 A1 | 5/2007 | Hu et al. |
| 2007/0136305 A1 | 6/2007 | Kelley et al. |
| 2007/0136306 A1* | 6/2007 | Kelley et al. ............ 707/10 |
| 2007/0174614 A1 | 7/2007 | Duane et al. |
| 2007/0240226 A1 | 10/2007 | Song et al. |
| 2008/0052775 A1 | 2/2008 | Sandhu et al. |
| 2008/0098039 A1* | 4/2008 | Kruis et al. ............ 707/201 |
| 2008/0140476 A1 | 6/2008 | Anand et al. |
| 2008/0172373 A1 | 7/2008 | Jenson et al. |
| 2008/0235243 A1 | 9/2008 | Lee et al. |
| 2008/0243609 A1 | 10/2008 | Murto et al. |
| 2008/0275753 A1 | 11/2008 | Protheroe et al. |
| 2009/0048922 A1* | 2/2009 | Morgenstern et al. .......... 705/14 |
| 2009/0077000 A1 | 3/2009 | Begole et al. |
| 2009/0094642 A1 | 4/2009 | Hobson |
| 2009/0132813 A1 | 5/2009 | Schibuk |
| 2009/0150238 A1 | 6/2009 | Marsh et al. |
| 2009/0157502 A1* | 6/2009 | Cooper et al. .............. 705/14 |
| 2009/0164557 A1 | 6/2009 | Marlow et al. |
| 2009/0234708 A1 | 9/2009 | Heiser et al. |
| 2009/0234909 A1 | 9/2009 | Strandell et al. |
| 2009/0248496 A1 | 10/2009 | Hueter et al. |
| 2009/0298480 A1 | 12/2009 | Khambete et al. |
| 2009/0300745 A1 | 12/2009 | Dispensa |
| 2009/0307759 A1 | 12/2009 | Schnell et al. |
| 2009/0320091 A1 | 12/2009 | Torres et al. |
| 2010/0057843 A1 | 3/2010 | Landsman et al. |
| 2010/0088519 A1 | 4/2010 | Tsuruoka et al. |
| 2010/0180009 A1 | 7/2010 | Callahan |
| 2010/0186084 A1 | 7/2010 | Hamid |
| 2010/0199098 A1* | 8/2010 | King ............ 713/182 |
| 2010/0293049 A1 | 11/2010 | Maher et al. |
| 2010/0313009 A1 | 12/2010 | Combet et al. |
| 2010/0318432 A1 | 12/2010 | Zinkevich et al. |
| 2011/0010243 A1 | 1/2011 | Wilburn et al. |
| 2011/0047032 A1 | 2/2011 | Kumar et al. |
| 2011/0055556 A1 | 3/2011 | Choi et al. |
| 2011/0110515 A1 | 5/2011 | Tidwell et al. |
| 2011/0153428 A1 | 6/2011 | Ramer et al. |
| 2011/0154499 A1 | 6/2011 | Rohan et al. |
| 2011/0213977 A1 | 9/2011 | Little |
| 2011/0231478 A1 | 9/2011 | Wheeler et al. |
| 2011/0251878 A1 | 10/2011 | Subramanian et al. |
| 2011/0276383 A1 | 11/2011 | Heiser et al. |
| 2011/0289314 A1 | 11/2011 | Whitcomb |
| 2011/0314114 A1 | 12/2011 | Young et al. |
| 2012/0023547 A1 | 1/2012 | Maxson et al. |
| 2012/0030554 A1 | 2/2012 | Toya |
| 2012/0054680 A1 | 3/2012 | Moonka et al. |
| 2012/0060120 A1 | 3/2012 | Aravamudan et al. |
| 2012/0096088 A1 | 4/2012 | Fahmy |
| 2012/0096491 A1 | 4/2012 | Shkedi |
| 2012/0109734 A1 | 5/2012 | Fordyce et al. |
| 2012/0158491 A1 | 6/2012 | Goulden et al. |
| 2012/0167185 A1 | 6/2012 | Menezes et al. |
| 2012/0253920 A1 | 10/2012 | Yarvis et al. |
| 2012/0253926 A1 | 10/2012 | Chen et al. |
| 2012/0321143 A1 | 12/2012 | Krupka et al. |
| 2012/0323674 A1 | 12/2012 | Simmons et al. |
| 2012/0323686 A1 | 12/2012 | Burger et al. |
| 2012/0331287 A1 | 12/2012 | Bowman et al. |
| 2013/0036434 A1 | 2/2013 | Shkedi et al. |
| 2013/0055309 A1 | 2/2013 | Dittus |
| 2013/0110623 A1* | 5/2013 | Kilroy et al. ............ 705/14.53 |
| 2013/0124309 A1 | 5/2013 | Traasdahl et al. |
| 2013/0124628 A1 | 5/2013 | Weerasinghe |
| 2013/0159254 A1 | 6/2013 | Chen et al. |
| 2013/0169434 A1 | 7/2013 | McCown et al. |
| 2013/0179502 A1 | 7/2013 | Faller et al. |
| 2013/0238745 A1 | 9/2013 | Ramachandran et al. |
| 2013/0246527 A1* | 9/2013 | Viera ............ 709/204 |
| 2013/0252628 A1 | 9/2013 | Kuehnel |
| 2013/0254685 A1 | 9/2013 | Batraski et al. |
| 2013/0290503 A1 | 10/2013 | Rajkumar et al. |
| 2013/0290711 A1 | 10/2013 | Rajkumar et al. |
| 2013/0291123 A1 | 10/2013 | Rajkumar et al. |
| 2013/0332987 A1 | 12/2013 | Tenneti et al. |
| 2014/0244351 A1 | 8/2014 | Symons |
| 2015/0127628 A1* | 5/2015 | Rathod ............ H04W 4/206 707/710 |

FOREIGN PATENT DOCUMENTS

| | | |
|---|---|---|
| JP | 2007102780 A | 4/2007 |
| JP | 2011-096093 A | 5/2011 |
| KR | 10-2012-0004054 | 1/2012 |
| WO | WO2007059087 A2 | 5/2007 |
| WO | WO2011109865 A1 | 9/2011 |

OTHER PUBLICATIONS

Marshall, J., "Device Fingerprinting Could Be Cookie Killer," ClickZ.com, Mar. 2, 2011 [online] [Retrieved on Dec. 2, 2011]; Retrieved from the Internet URL: http://www.clickz.com/clickz/news/2030243/device-fingerprinting-cookie-killer/; 4 pages.

International Search Report in International Application No. PCT/US2013/038461, mailed Sep. 17, 2013, 12 pages.

International Search Report in International Application No. PCT/US2013/038457, mailed Sep. 17, 2013, 10 pages.

International Search Report in International Application No. PCT/US2013/038482, mailed Aug. 12, 2013, 10 pages.

* cited by examiner

340

Link multiple anonymous identifiers associated with a user by a service using a key exchange protocol without storing personally identifiable information associated with the user in the linking  342

Receive requests at the service for content from a client device associated with the user, wherein each request includes one of the anonymous identifiers  344

Provide content associated with the user that is responsive to the received requests and based on the linking.  346

Create public-private key pairs for a user each time the user logs into a service from a different device including publishing respective public keys of the user in a directory entry associated with the user  362

Create, by each device, a secret key using a public key of another device that is stored in the directory that does not include personally identifiable information associated with users  364

Associate the secret keys with a plurality of anonymous identifiers, each anonymous identifier assigned to the user when logged into a respective different device  366

Provide content associated with the user and based at least in part on the association  368

FIG. 3C

BOOKMARKING CONTENT FOR USERS ASSOCIATED WITH MULTIPLE DEVICES

CROSS-REFERENCE TO RELATED APPLICATIONS

This application is a continuation-in-part of and claims priority to U.S. application Ser. No. 13/458,124, filed on Apr. 27, 2012, the entire contents of which are hereby incorporated by reference.

TECHNICAL FIELD

This application relates to information retrieval.

BACKGROUND

This specification relates to information presentation.

The Internet provides access to a wide variety of resources. For example, video and/or audio files, as well as web pages for particular subjects or particular news articles, are accessible over the Internet. A user may access content on plural different devices, such as by way of a mobile communication device (e.g., smartphone) and also by way of another device (e.g., a desktop computer or a tablet computer).

When a user accesses content on a device, various preferences can be saved for the user and maintained on the device. For example, a browser associated with a device can access content over the Internet and include one or more stored preferences related to the user or device. One example of a stored preference is a bookmark. A bookmark can be stored by a browser as a quick reference to an Internet resource that has been accessed by an entity when using the browser. Conventionally, bookmarks and other preference information are maintained on an account level.

SUMMARY

In general, one innovative aspect of the subject matter described in this specification can be implemented in methods that include a computer-implemented method for providing content. The method includes anonymously linking a plurality of identifiers, each identifier associated with a user and a specific requesting source. The anonymously linking includes linking at least two different identifiers that are associated with two different requesting sources used by the user to access content. The anonymously linking includes linking the two different identifiers using an identifier that does not include any personally identifiable information. The method further includes receiving a request from a user to create a bookmark for a resource that was presented on a first device, the first device having an associated first identifier. The method further includes storing the bookmark or a reference to the bookmark including storing a reference to the first identifier. The method further includes synching bookmarks associated with the user across multiple requesting sources. The synching uses the anonymous linking of the plurality of identifiers to link bookmarks that are associated with different identifiers. The method further includes after the synching, receiving a request from a user when the user is accessing a second different device that is associated with a second different identifier, the request including a request to access saved bookmarks associated with the user. The method further includes determining that the bookmark that was stored with reference to the first identifier should be provided responsive to the request based at least in part on the synched bookmarks. The method further includes providing the bookmark, a link to the bookmark or enabling presentation of a resource associated with the bookmark to the user.

These and other implementations can each optionally include one or more of the following features. The bookmark can be associated with an advertisement or a coupon. The first device can be a mobile device and the second device can be a non-mobile device. The content item can be a bookmark of a webpage. The request can include the second identifier. The different requesting sources can be selected from the group comprising: a mobile device including a smart phone, a laptop computer, a tablet, a desktop device, a set-top box, a television, a browser, an application on a mobile device, or a stand-alone application. Receiving a request to save a bookmark can include receiving input from a control associated with an advertisement, the input indicating that the advertisement is to be saved. Receiving a request to access saved bookmarks can include receiving a request to access the saved advertisement. The linking can occur without requiring a user to log into either requesting source. The anonymously linking can include linking identifiers using a Diffie-Hellman key exchange protocol. The anonymously linking can include linking identifiers using a secret key derived from a seed that is unique to the user. The synching may not require an explicit user account creation or a user login step.

In general, another innovative aspect of the subject matter described in this specification can be implemented in methods that include another computer-implemented method for providing creatives. A computer program product is embodied in a tangible medium including instructions, that when executed, cause a processor to anonymously link a plurality of identifiers, each identifier associated with a user and a specific requesting source. The anonymously linking includes linking at least two different identifiers that are associated with two different requesting sources used by the user to access content. The anonymously linking includes linking the two different identifiers using an identifier that does not include any personally identifiable information. The instructions further cause the processor to receive a request from a user to create a bookmark for a resource that was presented on a first device, the first device having an associated first identifier. The instructions further cause the processor to store the bookmark or a reference to the bookmark including storing a reference to the first identifier. The instructions further cause the processor to synch bookmarks associated with the user across multiple requesting sources. The synching uses the anonymous linking of the plurality of identifiers to link bookmarks that are associated with different identifiers. The instructions further cause the processor to, after the synching, receive a request from a user when the user is accessing a second different device that is associated with a second different identifier, the request including a request to access saved bookmarks associated with the user. The instructions further cause the processor to determine that the bookmark that was stored with reference to the first identifier should be provided responsive to the request based at least in part on the synched bookmarks. The instructions further cause the processor to provide the bookmark, a link to the bookmark or enable presentation of a resource associated with the bookmark to the user.

These and other implementations can each optionally include one or more of the following features. The bookmark can be associated with an advertisement or a coupon. The first device can be a mobile device and the second device can be a non-mobile device. The content item can be a bookmark of a webpage. The anonymously linking can include linking identifiers using a Diffie-Hellman key exchange protocol. The anonymously linking can include linking identifiers using a secret key derived from a seed that is unique to the user. The synching may not require an explicit user account creation or a user login step.

In general, another innovative aspect of the subject matter described in this specification can be implemented in systems that include a system for providing content. The system includes a processor and a memory including instructions that, when executed cause the processor to anonymously link a plurality of identifiers, each identifier associated with a user and a specific requesting source. The anonymously linking includes linking at least two different identifiers that are associated with two different requesting sources used by the user to access content. The anonymously linking includes linking the two different identifiers using an identifier that does not include any personally identifiable information. The instructions further cause the processor to receive a request from a user to create a bookmark for a resource that was presented on a first device, the first device having an associated first identifier. The instructions further cause the processor to store the bookmark or a reference to the bookmark including storing a reference to the first identifier. The instructions further cause the processor to synch bookmarks associated with the user across multiple requesting sources. The synching uses the anonymous linking of the plurality of identifiers to link bookmarks that are associated with different identifiers. The instructions further cause the processor to, after the synching, receive a request from a user when the user is accessing a second different device that is associated with a second different identifier, the request including a request to access saved bookmarks associated with the user. The instructions further cause the processor to determine that the bookmark that was stored with reference to the first identifier should be provided responsive to the request based at least in part on the synched bookmarks. The instructions further cause the processor to provide the bookmark, a link to the bookmark or enable presentation of a resource associated with the bookmark to the user.

Particular implementations may realize none, one or more of the following advantages. Users having multiple linked devices (e.g. a non-mobile device linked to a mobile device) can bookmark a web page on a first device, and later view the bookmark on a second different device and use the bookmark to quickly access the same resource on the second different device. Users can view and save a sponsored content item (e.g., a coupon) on one device and later can access the same sponsored content item on a different device that is linked to the first device.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process for providing content to a user on any of multiple devices associated with the user.

FIG. 3C is a flowchart of an example process for providing content to a user on any of multiple devices using public-private keys.

Like reference numbers and designations in the various drawings indicate like elements.

DETAILED DESCRIPTION

Figure 1:
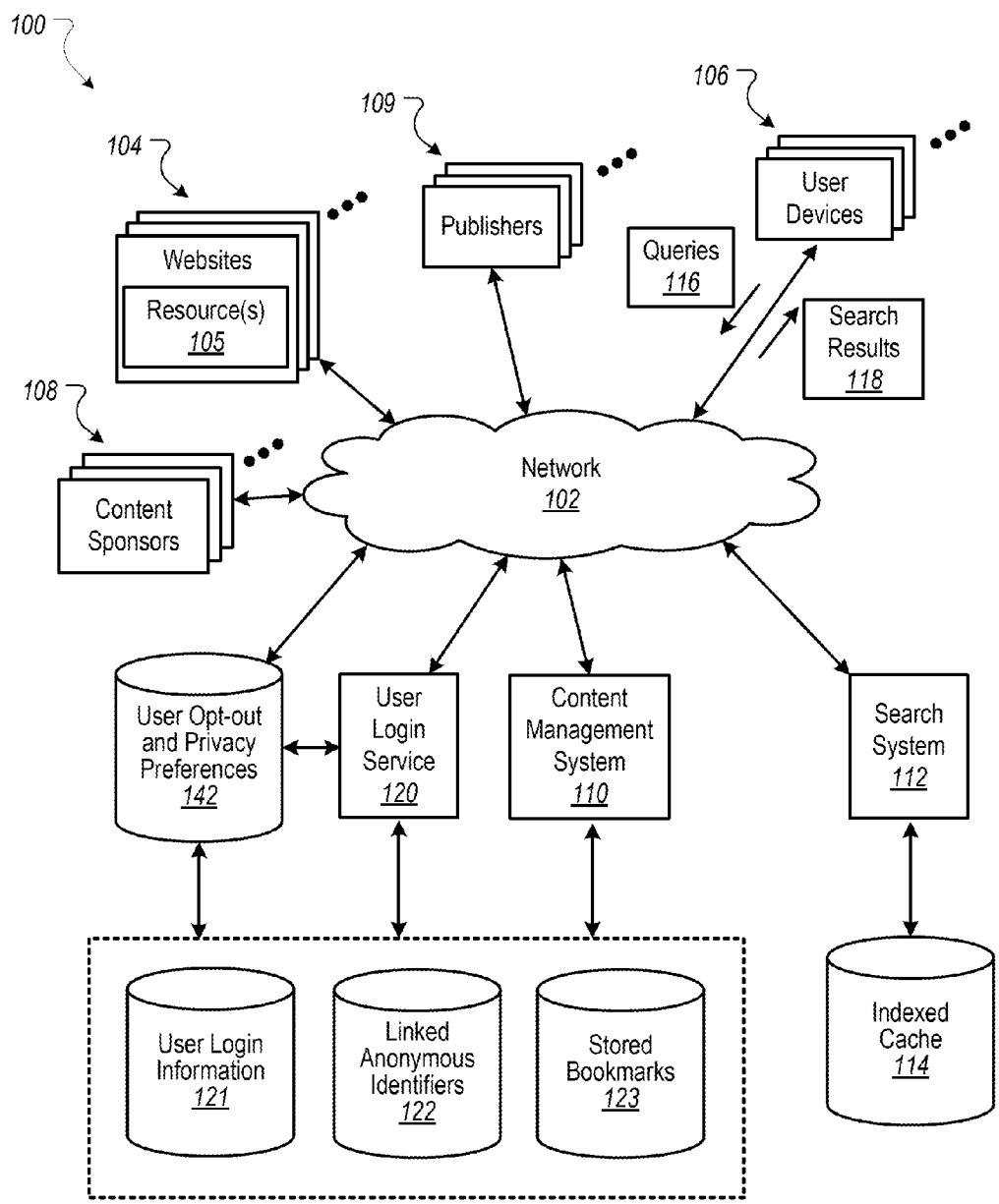
FIG. 1 is a block diagram of an example environment for delivering content.

This document describes methods, processes and systems for saving and using content across multiple linked requesting sources associated with a user. Requesting sources can include mobile devices (e.g., smart phone), laptop computers, tablets, desktop devices, set-top boxes, televisions, browser, applications on a mobile device, or stand-alone applications. The devices can be linked and used in this way, for example, without storing personally identifiable information associated with the user.

For example, a user with a mobile device (e.g., a smart phone) may view a resource on a first device (e.g., a web page). The resource can be saved as a bookmarked resource on the first device. Later, the user can re-call the bookmarked resource on a second different device. In one example scenario, a user can view an advertisement for a camera, and the advertisement may include a coupon or other offer. While using the mobile device, for example, the user may briefly check out the camera on a web site, but may decide to wait until later to fully investigate details regarding the camera and/or to make a purchase. For example, the user can bookmark a web page that is associated with the camera, or the user may save the advertisement or the coupon. Later on, the user may use a different device (e.g., a laptop computer or personal computer) to access the saved content, e.g., using the bookmarked web page or the saved advertisement or coupon. The saved content is available to the user in these examples because the devices are linked, e.g., using anonymous linking of requesting sources without requiring the user to be logged in to a service per se.

In some implementations, a user service can be used to facilitate the collection of linked resource information, which can then be used for saving and re-calling content across multiple linked requesting sources associated with a user. For example, when a user logs onto a user service from a first device (e.g., the user's home PC), a public key-private key pair can be determined and the public key can be published. The public key can be associated with the user's first device and stored by the user service. The private key can be stored locally. Subsequently, when the user logs into the service from a second different device, the second different device can also determine a public-private key pair. Each device can subsequently compute a secret key using the device's own private key and the other device's published public key. The secret key can be stored in combination with anonymous identifiers of each device, thus creating a linking or association between the devices. The association can be used to link or associate an impression on one device to a user interaction (e.g., a conversion) on a second different device. A user's different devices provide one example of different requesting resources for which conversions can be tracked. For example, different requesting sources can include a mobile device including a smart phone, a laptop computer, a tablet, a desktop device, a set-top box, a television, a browser, an application on a mobile device, or a stand-alone application. Other requesting sources are possible.

In some implementations, the anonymous identifiers can be cookies, browser cookies, device identifiers, or other identifiers that are associated with each device. As a result, the mapping can identify all of the devices associated with the user without storing personally identifiable information (PII) associated with the user. When content is subsequently provided to the user on any of the devices, information included in the mapping can be used to assist in selecting relevant content to be provided to the user. The selection of relevant content can include decisions regarding how content is delivered to the user, such as and including, limitations on when or how content is delivered. For example, the number of impressions of an advertisement can be limited to a fixed number of impressions per user per time period regardless of how many devices the user uses.

In some implementations, anonymous identifiers can be associated with different browsers or other applications on the same device. For example, the techniques described in this disclosure can be used to link two or more identifiers of applications that may have different cookie spaces on the same device, or applications on different devices, or a combination of both.

In some implementations, linking anonymous identifiers can be used in handshaking among mobile applications or a combination of mobile applications, browsers and other applications. For example, mobile applications may each have their own cookie space even on the same device which can prevent handshaking with other applications. Each mobile application can use the techniques described herein to generate, for example, a private key an a public key, publish the public key, access public keys of other mobile applications (or associated with other devices), and compute secret keys using their own private keys and the public keys of other mobile applications (or associated with other devices).

In some implementations, users may be provided with an opportunity to enable/disable programs or features that allow the user to be discovered across multiple devices and/or to be provided content based on the discovery. For example, the user can enable/disable programs or features related to the use of user interactions on anonymously-linked requesting sources.

In some implementations, the mapping process can be repeated periodically to ensure that the anonymous identifiers (e.g., cookies) are not stale, thus keeping session history information for the user up-to-date. For example, cookies on a computer can expire over time, or a user can clear a cookie, resulting in setting a new cookie. Repeating the cookie-mapping process periodically can ensure that the current set of cookies belonging to the user are correctly mapped. While reference is made to cookies, other forms of anonymous identifiers that include or have been derived from a seed can be used.

In some implementations, user session history information can be stored anonymously. For example, the session history information can include a user's browsing history, the times that the user has seen a particular advertisement, and other session history information. The information can be stored in association with the anonymous identifiers described herein. In some implementations, session history information associated with the user's session on a first device can be stored in a table that includes the anonymous identifier associated with the first device. The same table can also be used to store the same user's session history information for the user's session on a second device. In some implementations, a separate or the same table can be used to store associations among the anonymous identifiers. In some implementations, anonymous identifiers, the associations (e g, linking to the secret key), and the session data all can be stored, for example, without any corresponding personally identifiable information for a given user.

As will be described in further detail below, subsequent to the storage of the association and session history information, a request for content (e.g., an advertisement) can be sent from any of the devices associated with that user (the request including an anonymous identifier associated with a given device). In some implementations, the session history information stored in the tables can be used in determining, for example, advertisements that may be of interest to the user responsive to the received request. The determination can include inferences for the user based on the user's stored session history information. In some implementations, the session history information for the user can be aggregated, e.g., by joining tables using the anonymous identifiers. For example, a request for content can be received, and the request can include an anonymous identifier associated with a user's desktop device. The received anonymous identifier can be used to look up the user's other anonymous identifiers (e.g., for mobile and other devices of the user). The retrieved set of anonymous identifiers can be used to access session history information in the other tables (e.g., user browsing history). In some implementations, all of the session history information can be joined together for the respective devices producing aggregated information. In some implementations, the aggregated session history information can be provided to a content management system in order to determine and select eligible content for delivery to the user responsive to the received request. For example, because the session history information can include the number of times that the user has seen a particular advertisement, the content management system can help to avoid selecting an advertisement for the user which has already been presented a predetermined number of times.

In some implementations, aggregating the information can occur on demand, e.g., in real time after a request for content occurs. For example, the user's session history information, stored individually by anonymous identifier in the various tables, can be joined. Aggregating the information in real time can solve issues, for example, related to whether the user has consented to being provided content based on the devices used by the user. For example, session history information for a device for which the user has not consented will not be aggregated with other session history information. In some implementations, the information for a user can be aggregated and stored in advance of any requests for content. For example, all of the user session history information can be stored in a third table, e.g., that includes all of the user session history information across all of the user's devices.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the example environment 100 further includes a user login service 120 that can provide, for any particular user, access to the user's Web services, e-mail, social networks, business applications or other resources. For example, the user login service 120 can receive login requests from the user, such as through a Web browser or other application running on any device associated with the user. The login request can include, for example, the user's login ID (e.g., a unique identifier, an email address, a phone number, or any other identifier for the user that can be used for verifying the user at login). The user login service 120 can also maintain information related to the devices on which the user is currently logged on, or has been logged into recently. The information can include, for example, a mapping of anonymous identifiers for the devices with a session key that does not contain personally identifiable information associated with the user. In some implementations, the mapping can be stored, for each user, in a data store of linked anonymous identifiers 122, or in some data structure.

In some implementations, a data store of stored bookmarks 123 can store bookmarks and/or references (e.g., URLs or other links) to the bookmarks. Each bookmark stored can be associated with a resource that is presented to a user on a first requesting source for which the user has requested to be able to later access on the same or a different source. In some implementations, the bookmark (and/or reference to the bookmark) can include storing a reference to a first identifier, e.g., an anonymous identifier associated with the first requesting source. Linking the anonymous identifiers 122 allows for association of a bookmarked item with plural different requesting sources. As a result, the associated resource (e.g., bookmarked web page, saved advertisement or saved coupon) can be made available to the user on a different, linked requesting source than the source originally used to set the bookmark.

In some implementations, the user login information 121 or some other data store can store user login IDs, public keys and initial seeds. For example, the information can be used by a second device used by a user to access the public key published by a first device used by the same user. Similarly, the user's first device can access the public key published by the second device. At the same time, seed values can be read from the user login information 121 by any of the user's devices and used to determine a secret key.

A data store of user consents and privacy preferences 142 can include information that the user has provided regarding if and how information about the user's different devices can be used. For example, users can use one or more user preferences web page that may be part of (or separate from) the user login service 120. In some implementations, users can set a preference that says, "Do not link my different devices," or selectively identify which devices are allowed (or not allowed) to be linked. Then, before any operation is performed that may link the anonymous identifiers of the user's different devices, the user's consents and privacy preferences can be checked, and the linking will be performed only if allowed by the user. In some implementations, the user may specify settings that prohibit providing content based on the linking. For example, while the user may allow his smart phone and PC to be linked, the user may decide that no content (e.g., advertisements) should be provided based on the linking.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is responsive to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals. Other information, such as user identifier information that is associated with the mappings described above, can be used and/or evaluated when selecting eligible content.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a cost per thousand impressions (CPM) bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable or observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by recognizing a user when the user has accessed resources using multiple devices. For example, if it is known that a content item (e.g., an advertisement) has already been seen by a user on a first device (e.g., the user's home PC), then a determination can be made (e.g., through parameters) whether or not to provide the same content item to the same user on a different device (e.g., the user's smartphone). This can increase the likelihood of a conversion, for example, by either repeating impressions of an advertisement or avoiding subsequent impressions, depending on how multiple impressions for the advertisement to the same user are predicted to lead to a conversion in either case.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

FIGS. 2A-2E collectively show an example system 200 for providing content to a user who is recognized when using multiple different devices. In some implementations, recognition of the user across different devices can be achieved by linking anonymous identifiers of the user's multiple different devices. As an example, an anonymous identifier 206a of a first device 106a (e.g., a desktop computer of a user 202) can be linked to an anonymous identifier 206b of a second different device 106b (e.g., a laptop computer of the user 202). In some implementations, the system 200 can be part of the environment 100 that is described above with reference to FIG. 1. An example sequence of events (e.g., with numbered steps 0 and 1a through 8) follows for associating the anonymous identifiers 206a and 206b and providing content based on the association. However, other sequences can also be used to link devices 106a, 106b and additional devices 106 associated with the user 202. In some implementations, the devices 106a, 106b and additional devices 106 can be linked using associations stored in the linked anonymous identifiers 122. The associations can be stored, for example, without storing any personally identifiable information for the user 202.

Before any linking occurs using the anonymous identifiers associated with a user's different devices, e.g., at step 0, the user login service 120 (or the content management system 110) can check 107 the user's user consents and privacy preferences 142 to see if the user has consented to such linking. For example, if the user has specified not to allow the user's devices to be linked (or use information thereof), then steps 2a though 6b will not occur, and the content provided in step 8 may be different.

In some implementations, a first step 1a (e.g., as allowed by the user) of the sequence of steps can occur, for example, when the user 202 logs into the first device 106a (e.g., the user's desktop computer) using a login service (not shown in FIGS. 2A-2D). For example, the login service or some other component can receive a login request 208a from the first device 106a. The login request 208a can be associated with the anonymous identifier 206a (e.g., a cookie or device identifier) associated with the first device 106a. In some implementations, the login request 208a and/or other login requests can be requests to log into a social service.

In some implementations, the user login information 121 can store user login IDs 210, seeds 212 and public keys 214 associated with multiple users. The user login information 121, for example, can serve as a directory that includes one or more entries, each entry indexed by an identifier associated with a given user (e.g., user login identifier, email address, or some other identifier). For example, when the user 202 logs into the device 106a using the login service, information stored for the user in the user login information 121 can include a login ID 210a, a seed 212a (e.g., a generator-prime pair, such as 7, 11, that is usable by all of the user's devices), and, as will be discussed in further detail below, a public key 214. At the current stage of the sequence of steps, the public key 214 has not yet been determined for the current user. In some implementations, seeds 212 can vary by user, e.g., the seed 212b (e.g., generator-prime pair 11, 13) for a second user can be different from the seed 212a.

At step 2a, the first device 106a can read a seed 216a (e.g., a generator-prime pair 7, 11 from the user login information 121) and create a private-public key pair that is associated with the user 202 using the first device 106a. In some implementations, creating the private-public key pair can include, at step 3a, computing 218a a private key (e.g., 9) and computing a public key (e.g., 4). In some implementations, generation of public and private keys can use generator G, prime P pair (e.g., 7, 11), where G<P, an example of which is described with reference to FIG. 2F. At step 4a, the public key is published 220a, e.g., stored as the public key 214a. The private key 9 and the public key 4 constitute the private-public key pair, yet each typically is stored in a different location. For example, the private key 9 can be stored locally on the first device 106a, e.g., in local storage 221a. The public key (e.g., 4) can be stored in the user login information 121 as the public key 214a. In some implementations, the public key 214a can be stored in a row 222 that includes user login information for the user 202 on one or more devices (e.g., devices 106a and 106b in the current example). For example, the row 222 can serve as a directory entry associated with the user 202. Each of the other rows can be used to store information for a different user.

Figure 2A:
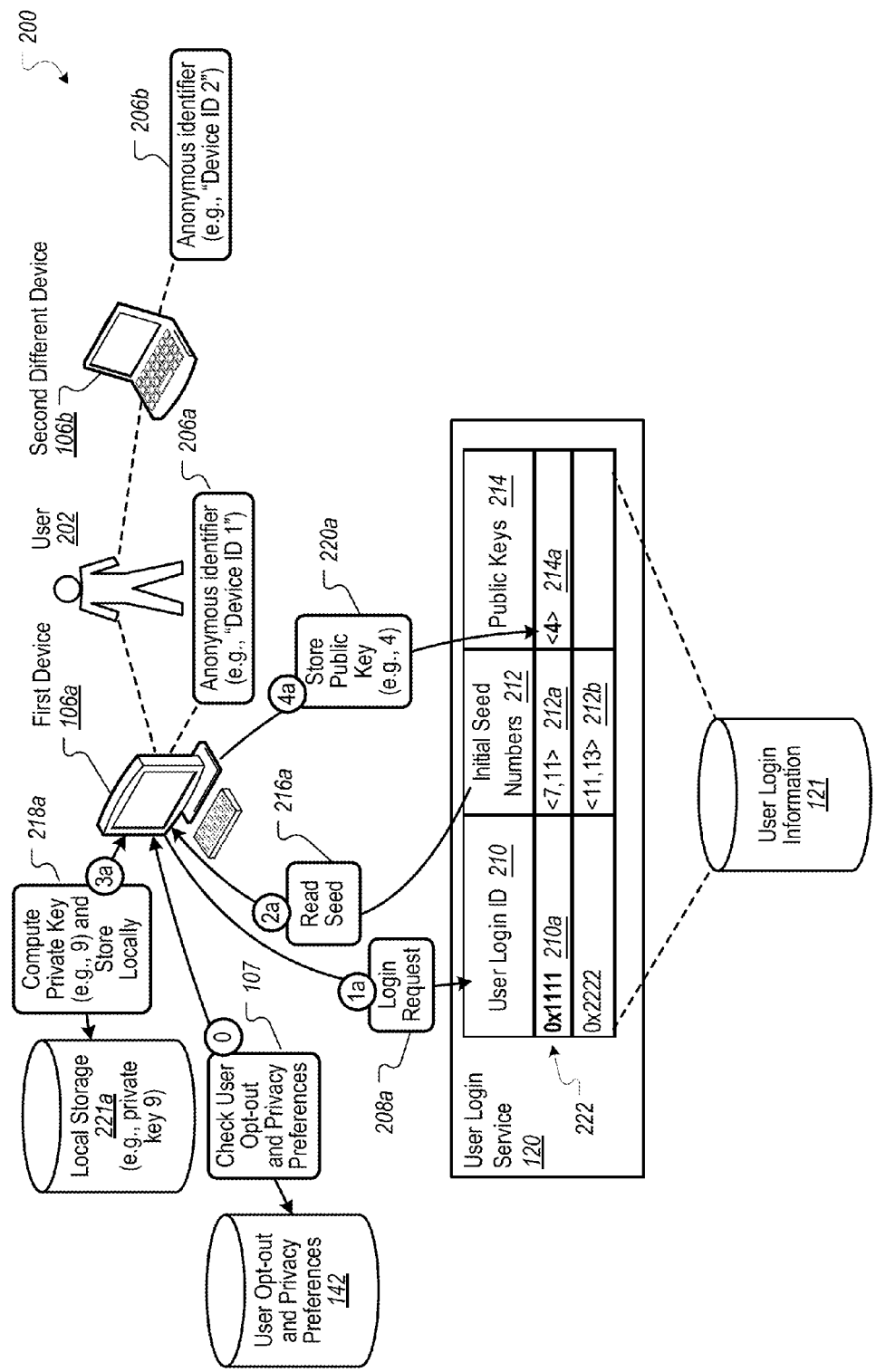
FIGS. 2A through 2E collectively show an example system for providing content to a user who is recognized when using multiple different devices.
Figure 2B:
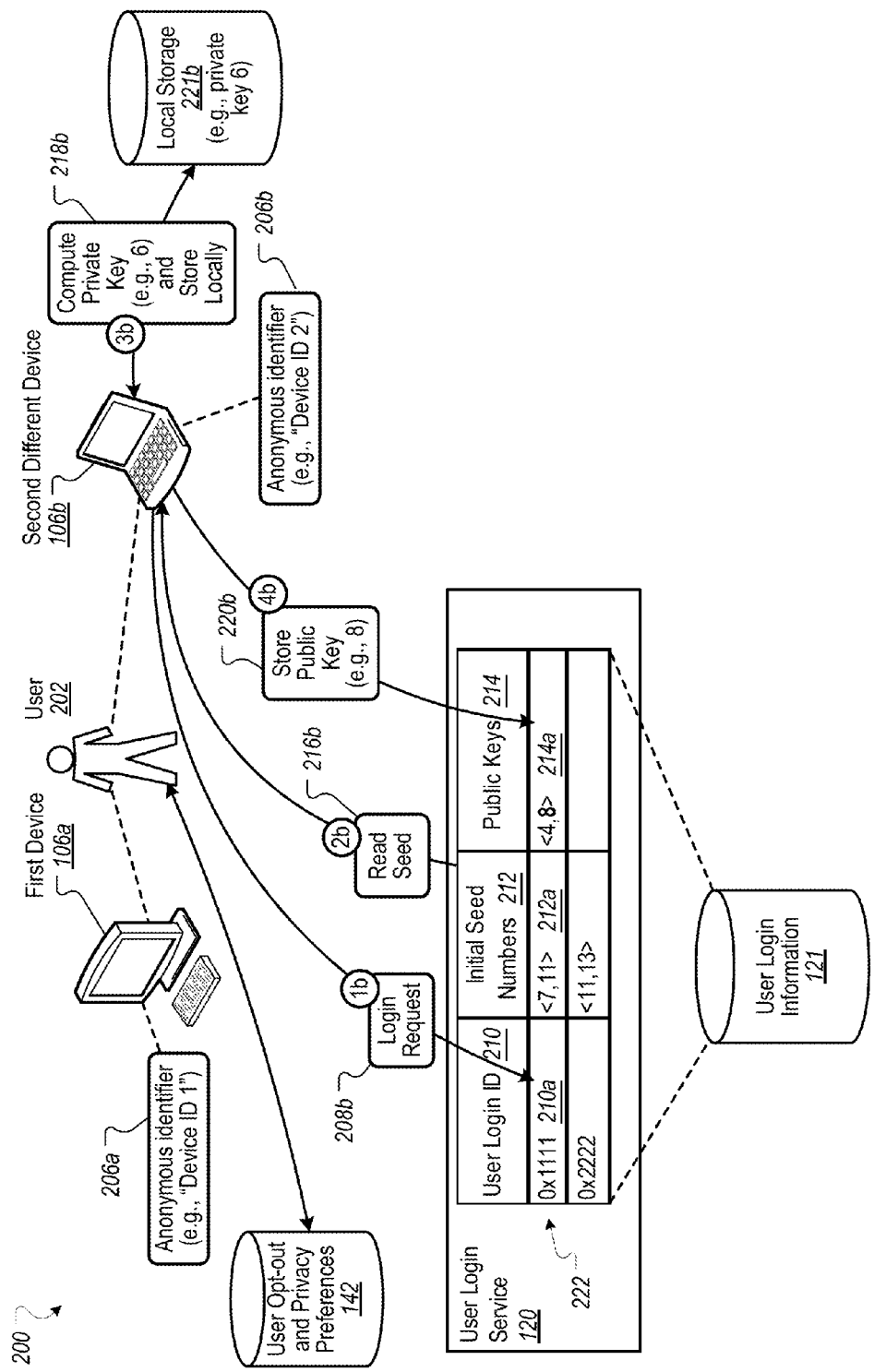

Referring now to FIG. 2B, at step 2b, after a login request (step 1b) by the user on a second different device 106b, a seed 216b (e.g., the generator-prime pair 7, 11) can be read (e.g., from the user login information 121) and a second private-public key pair that is associated with the user can be created. The second private-public key pair is associated with the user 202 using the second device 106b. For example, the second private-public key pair is different than the private-public key pair that is associated with the login by the user 202 on the first device 106a. In some implementations, creating the second private-public key pair can include, at step 3b, computing 218b a private key (e.g., 6) and computing a second public key (e.g., 8). At step 4b, the second public key is published 220b, e.g., by adding the second public key to the set of public keys stored as the public keys 214a. The private key 6 and the public key 8 constitute the second private-public key pair (e.g., <6, 8>), the values of which are different from those of the private-public key pair computed for the first device 106a (e.g., <9, 4>). In some implementations, the private key 6 can be stored locally on the second different device 106b, e.g., in local storage 221b. The public key (e.g., 8) can be stored, for example, in user login information 121 with the public key 4 from the first device 106a. As a result, the directory entry stored in the row 222 (and associated with the user 202) is updated, now including two public keys.

Figure 2C:
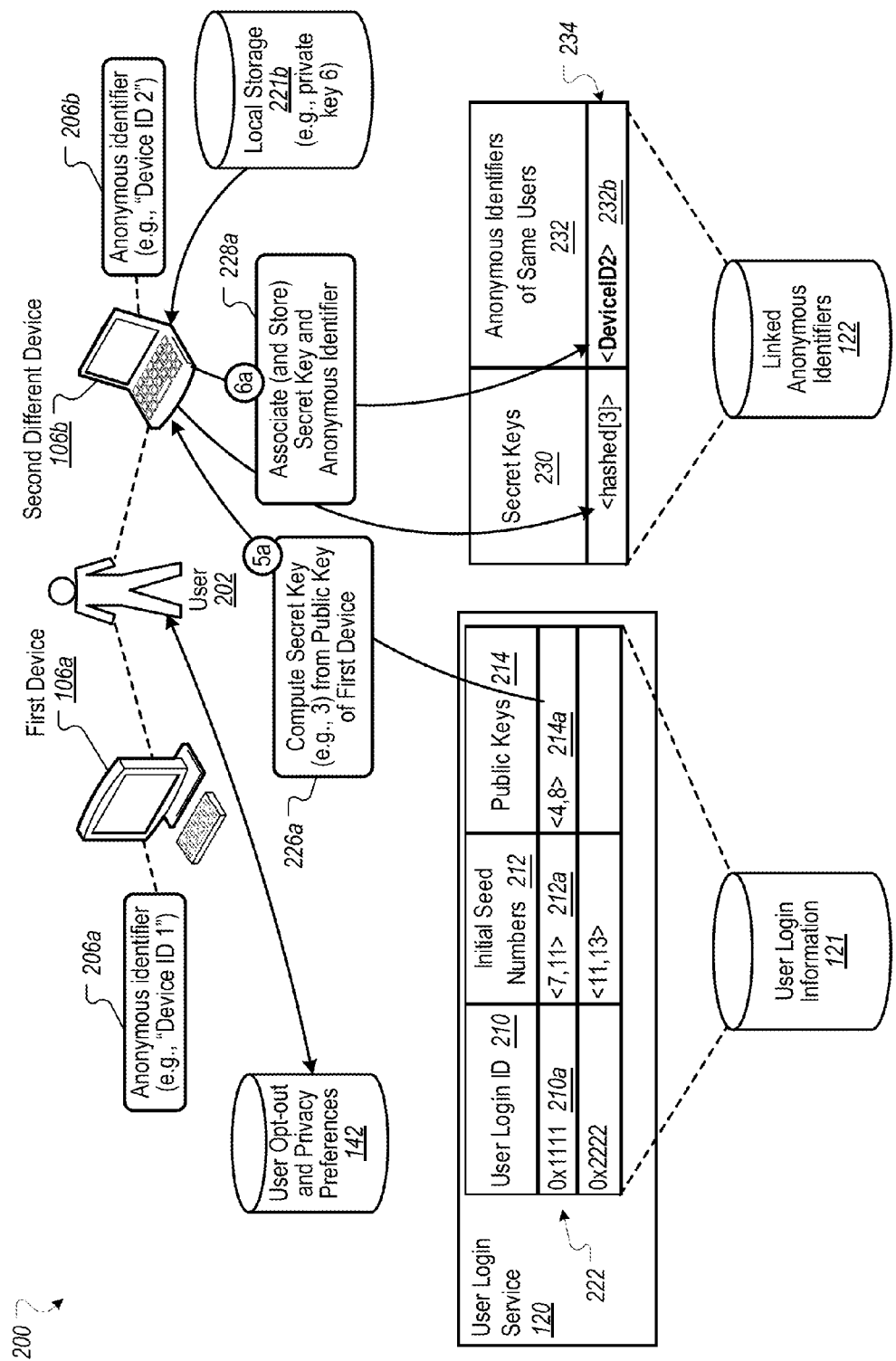

Referring now to FIG. 2C, at step 5a, the second different device 106b can create a secret key 226a (e.g., 3) using the public key (e.g., 4) from the first device 106a and the second private key (e.g., private key 6 from local storage 221b). At step 6a, the second different device 106b can also associate 228a the second anonymous identifier (e.g., "Device ID 2") with the secret key (e.g., 3). In some implementations, the association can include storing the association, e.g., in the linked anonymous identifiers 122. For example, the linked anonymous identifiers 122 can include secret keys 230 and anonymous identifiers of the same users 232. For example, a row 234 can include a secret key 230a (e.g., 3 or a hashed representation of 3) and the anonymous identifier 232b (e.g., "Device ID 2") that corresponds to the association that occurred in step 6a. At a time subsequent to the publishing of the second public key (e.g., 8), and after the secret key 3 has been computed and an association stored (e.g., as a hashed representation) with the second different device 106b, the user may log in again at the first device 106a. As a result, a login request 208c can be received (e.g., by the login service) from the user at the first device 106a. For example, the login request 208c can be similar to the login request 208a described above. However, in this case, the login service, for example, can determine that a public key exists for another device associated with the user, e.g., the second different device 106. Using the additional public key, a link or association can be made between the two devices 106a and 106b as described in further detail below. In some implementations, whenever the secret key is stored, the stored value can be a hashed version of the secret key, e.g., using a one-way hash function.

Figure 2D:
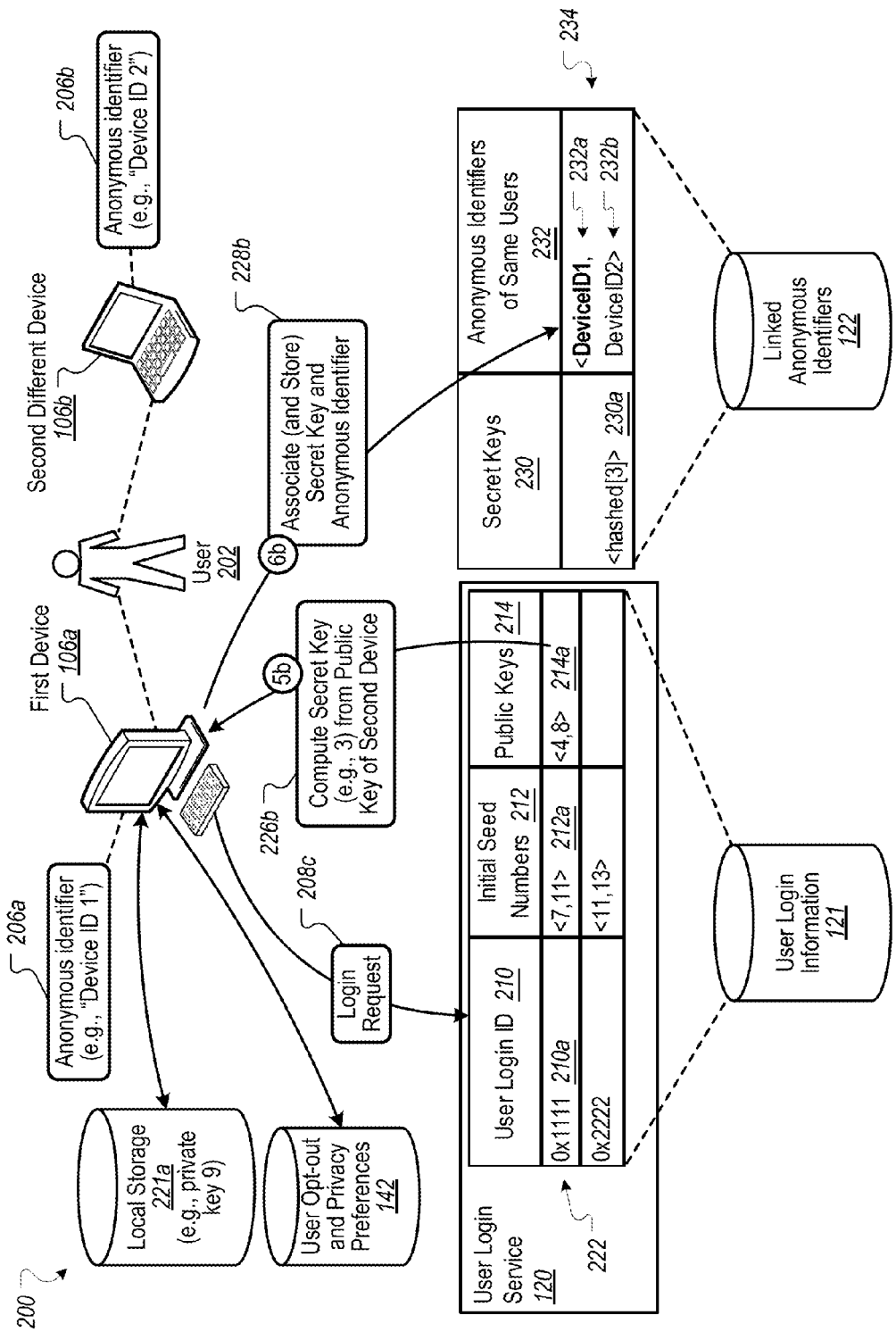

Referring now to FIG. 2D, at step 5b, in response to the login request 208c, the first device 106a can create a secret key 226b (e.g., 3) using the public key (e.g., 8) from the second different device 106b and the first private key (e.g., private key 6 from local storage 221a). For example, the secret key can match the secret key computed by the second different device 106b. At step 6b, the first device 106a can also associate 228b the second anonymous identifier (e.g., Device ID 2) with the secret key (e.g., 3). In some implementations, the association can include storing the association, e.g., in the linked anonymous identifiers 122. For example, the row 234 containing the secret key 230a (e.g., 3) and the anonymous identifier 232b (e.g., "Device ID 2") can be updated to also include the anonymous identifier 232a (e.g., "Device ID 1"). As a result of storing the association, the anonymous identifiers 206a and 206b, as well as the devices 106a and 106b, are now linked. Further, the association among the user's various devices is achieved without storing any personally identifiable information associated with the user.

In some implementations, it is possible that one or more anonymous identifiers such as anonymous identifier 232a or anonymous identifier 232b can appear in multiple rows (e.g., three or more) in the linked anonymous identifiers 122. This can be an indication, for example, that the device associated with the anonymous identifier is a shared device (e.g., at a library or an Internet café). In this example, the logins by several different users (e.g., three or more) would result in the creation of multiple rows in the anonymous identifiers 122, each having the same anonymous identifier. In some implementations, when highly-shared devices are detected in this way, the highly-shared devices can be un-linked, or other considerations can be taken. For example, thresholds can be established, and if a cookie or other anonymous identifier appears in more than three rows, the associated can be considered a shared machine.

Figure 2E:
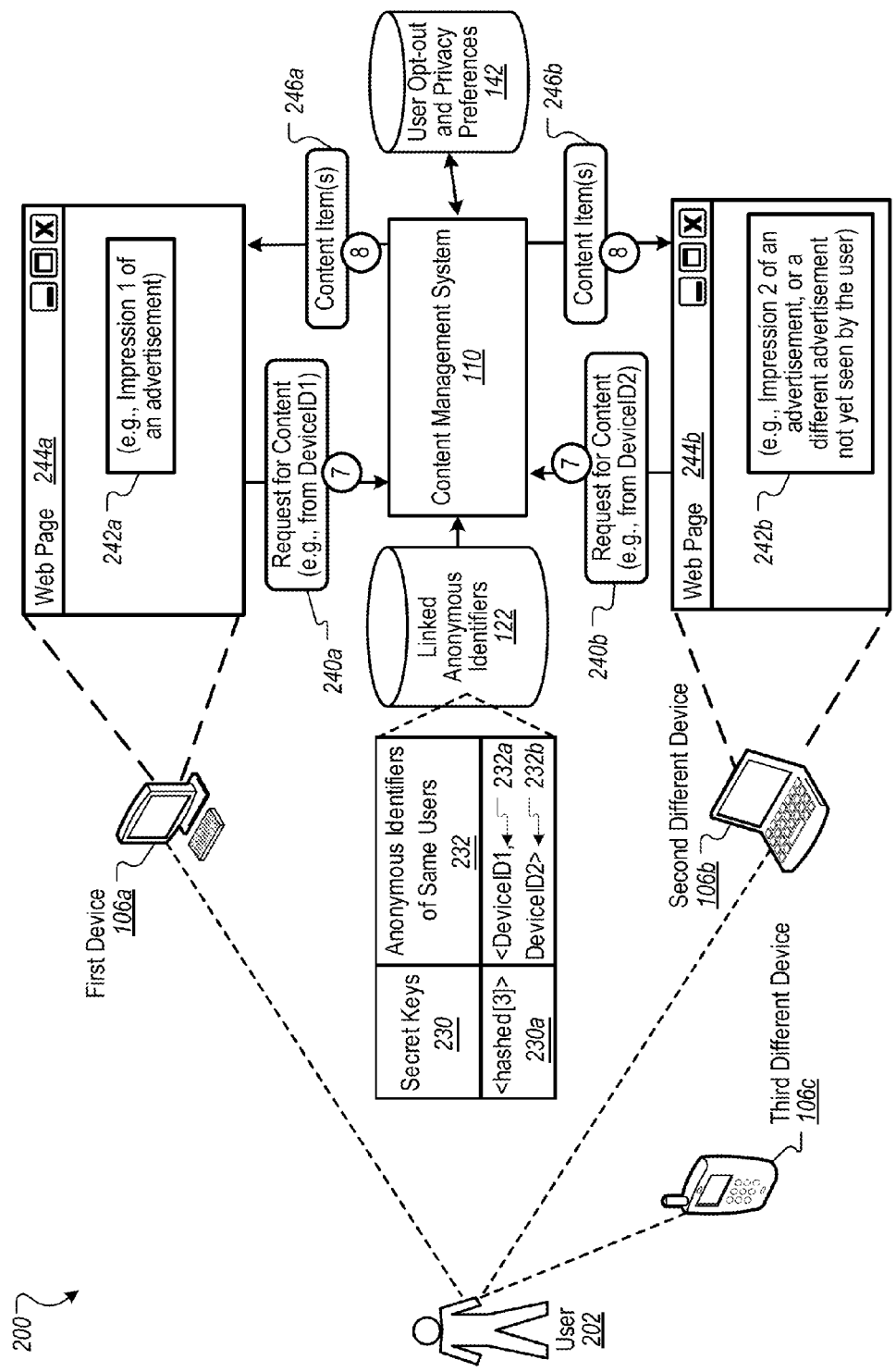

Referring to FIG. 2E, at step 7, the content management system 110 can receive a request for content 240a or 240b (e.g., a request for advertising content) from either the first device 106a or the second different device 106b. For example, the request for content 240a can be a request for an advertisement to fill an advertisement slot 242a on a web page 244a displayed on the first device 106a. In another example, the request for content 240b can be a request for an advertisement to fill an advertisement slot 242b on a web page 244b displayed on the second different device 106b. If the request for content 240a is from the first device 106a, for example, then the request for content can include the first anonymous identifier 232a. Otherwise, if the request for content 240b is from the second different device 106b, for example, then the request for content can include the second different anonymous identifier 232b.

Regardless of where the request for content originates, at step 8, the content management system 110 can provide a content item (e.g., content items 246a or 246b) in response to the request and using the association that maps the user 202 to multiple devices (e.g., from the linked anonymous identifiers 122). For example, the association can be represented by information in the row 234 that associates anonymous identifiers 232a and 232b, e.g., based on the same secret key 230a. Using this information, the content management system 110 can, for example, treat the requests for content as if they originate from the same user, regardless of the particular user device. In some implementations, identifying eligible content items for the request for content 240b, for example, can depend on content already provided to the same user 202 on the first device 106a. As a result, an advertisement for California vacations, for example, that is intended for one impression per user can be shown on the first device 106a and not repeated again on the second different device 106b. In some implementations, it can be beneficial to provide the same advertisement once and only once to each of the user's multiple devices.

Devices 106a and 106b are two examples of devices that the user 202 may use. For example, the user 202 may use a third different device 106c (e.g., a smart phone). When the user 202 uses the third different device 106c to log in, for example, the user login service 120 can store a third different anonymous identifier 232 in the linked anonymous identifiers 122. As a result, all three devices 106a-106c can be associated with the user 202, e.g., using the secret key 230a.

Similarly, other users can use the user login service 120 for logging in from multiple different devices. As a result of a second user logging into a fourth and a fifth device 106, for example, the user login service 120 can store fourth and fifth different anonymous identifiers in the linked anonymous identifiers 122 (e.g., stored in association with the second user using a secret key 230 that is different from the secret key 230a).

Figure 2F:
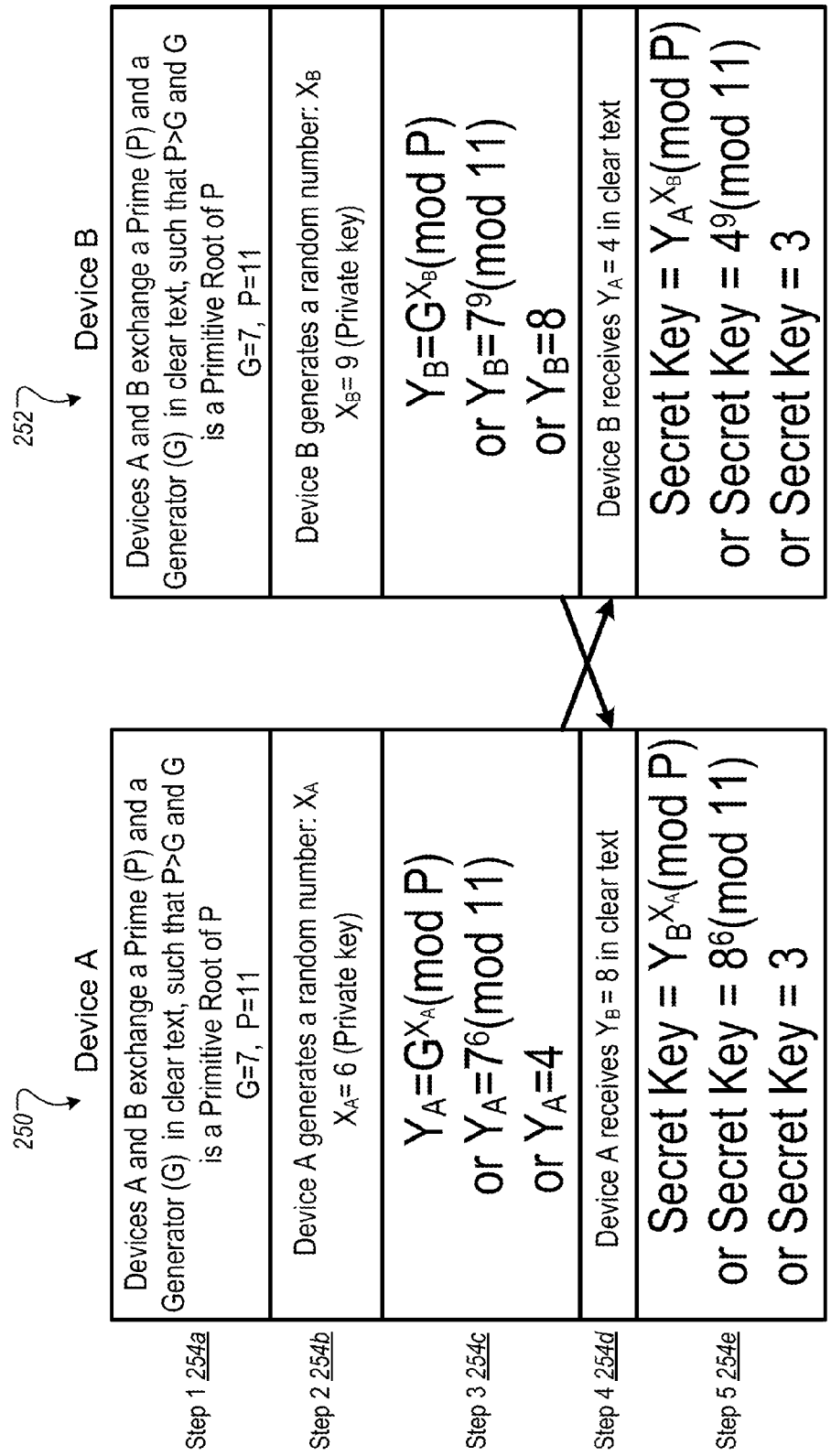
FIG. 2F shows example calculations of public, private and secret keys.

FIG. 2F shows example calculations of public, private and secret keys. Device A calculations 250 provide examples for computing a public key, a private key and a secret key on a first device, e.g., the first device 106a. Device B calculations 252 provide examples for computing a public key, a private key and a secret key on a second different device, e.g., the second different device 106b. Other methods can be used to determine public, private and secret keys.

In some implementations, the calculations can occur in steps, e.g., steps 254a-254e. For example, in step 1 254a, both devices A and B can exchange a prime P (e.g., 11) and a generator G (e.g., 7). In some implementations, the prime and generator can be stored in the user login information 121, as described above. For example, a prime and a generator that is unique to a user (and the devices associated with the user) can be determined and stored at a time that one or more entries in the user login information 121 are created and stored.

In step 2 254b, each device can generate its own private key, e.g., using a random number or in some other way. For example, device A's private key can be 6, and device B's private key can be 9. These private keys can be used in combination with at least the generator and prime from step 1 254a to determine public and private keys in the following steps.

In step 3 254c, each device can compute a public key. In some implementations, computing the public key can use a formula that includes the generator raised to the power of the device's private key, and a modulo P can be performed on the result. Using the generator, prime, and each of the devices' private keys, the resulting public keys for the devices can result in being 4 and 8, respectively.

At step 4 254d, once the public keys are determined, the devices can share their public keys, e.g., by publishing the keys in the user login information 121 as described above. As a result, device A can know device B's public key (e.g., 8), and device B can know device A's public key (e.g., 4).

At step 5 254e, secret keys can be computed, e.g., using a formula that raises the other device's public key to power of the current device's private key, and the result can undergo a modulo P (prime). As a result of the calculations, the secret key for the first and second devices can be 3. Once the secret key is determined, the value can be used by either device to update the row in the linked anonymous identifiers 122 with the device's anonymous identifier. This can be repeated for any other device associated with the same user that computes the secret key using its own private key and the public key from one of the other devices.

Figure 2G:
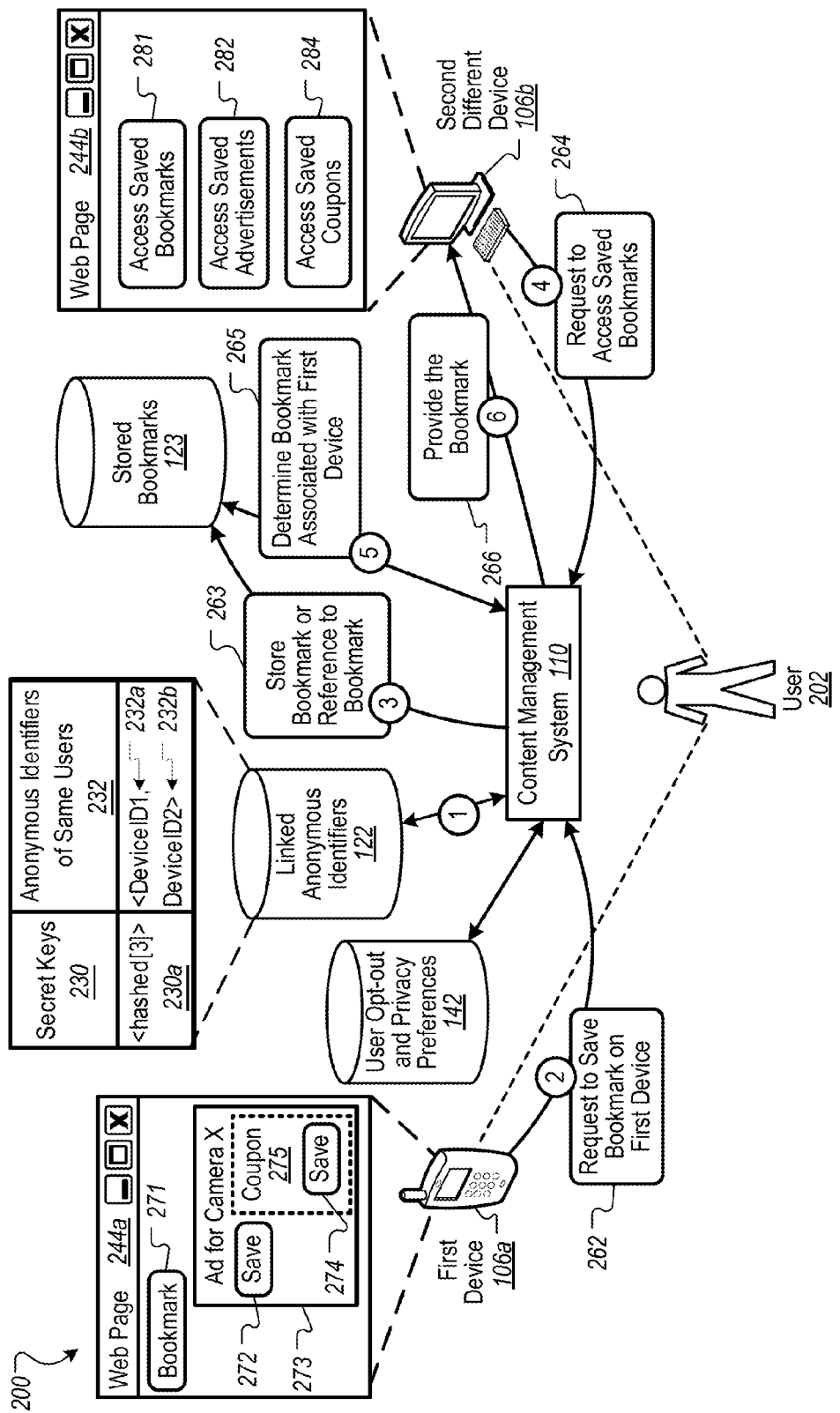
FIG. 2G shows an example sequence of events for saving and using content across multiple linked requesting sources associated with a user.

FIG. 2G shows an example sequence of events for saving and using content across multiple linked requesting sources associated with a user. By way of example, the requesting sources can include the first device 106a (e.g., the user's mobile device) and the second different device 106b (e.g., the user's personal computer).

Stage 1 of the example sequence of events can include a linking of the two devices 106a and 106b. As described above with reference to FIGS. 2A-2F, the two devices 106a and 106b can be linked by the content management system 110, e.g., using linked identifier information stored in the linked anonymous identifiers 122. Each identifier, for example, is associated with a user and a specific requesting source. The anonymous linking includes linking at least two different identifiers that are associated with two different requesting sources used by the user to access content, in this example, devices 106a and 106b. In some implementations, the linked anonymous identifiers 122 do not store user login information, account information, personal information or any other information that would make it possible to easily identify the user. While a Diffie-Hellman key exchange protocol is described herein as one possible way for anonymously linking identifiers, other techniques can be used to anonymously link requesting sources.

At stage 2 of the example sequence, a request 262 is received from a user to save a bookmark associated with a resource that was presented on a first device. For example, the user can select a bookmark control 271 to bookmark a web page 244a, e.g. that is displayed on the user's mobile device (e.g., first device 106a). In another example, the user can select a save control 272 to save an advertisement 273. In yet another example, the user can select a save control 274 to save a coupon 275. In some implementations, requests to bookmark content, such as described in these examples, can be received by the content management system 110. First device 106a can have an associated anonymous identifier, for example, that is anonymously linked to other identifiers associated with the user's other devices. Linking of devices is described in greater detail below.

At stage 3 of the example sequence the bookmark that was saved by the user is stored 263. For example, the bookmark can be saved using the bookmark control 271. The content management system 110 can store a reference (e.g., a URL) associated with the resource (e.g., web page 244a) in the stored bookmarks 123 as part of the save process. Other example content items stored can include a link or other reference for the advertisement 273 and a link, reference or other way for accessing the coupon 275. The bookmarks associated with the user can be synched across multiple requesting sources, and the synching can be facilitated by using the anonymous linking of the plurality of identifiers to link bookmarks that are associated with different identifiers. For example, the synching can occur automatically without requiring an explicit user account creation or a user login step.

At stage 4 of the example sequence, a request 264 is received from the user 202, e.g., to access a saved bookmark. The request can be received when the user uses a second different device (e.g., device 106b) that is associated with a second different identifier (e.g., an anonymous identifier linked to device 106a). The request can include a request to access saved bookmarks associated with the user. In some implementations, the request 264 can result from a user selection of a control, e.g., controls 281, 282 or 284 for accessing a saved bookmark, advertisement or coupon, respectively. In some implementations, the request can include the second identifier, e.g., the anonymous identifier of the user's non-mobile device that is anonymously linked to the user's mobile device. In the current example, the request 264 can include the anonymous identifier associated with the second different device 106b (e.g., the user's non-mobile device).

At stage 5 of the example sequence, a determination is made 265 whether the previously saved bookmark should be provided responsive to the request. For example, the content management system 110 can use information from the request 264 and information from the linked anonymous identifiers 122 to identify the stored bookmark (e.g., associated with the bookmarked page, saved advertisement or saved coupon) associated with the request 264.

The bookmark or a link to the bookmark is provided 266, or presentation of a resource associated with the bookmark to the user is enabled. For example, the content management system 110 can provide the bookmark or a link to the bookmark to the second different device 106b. In another example, the content management system 110 can enable presentation of the web page 244a, the advertisement 273, or the coupon 275.

Figure 3A:
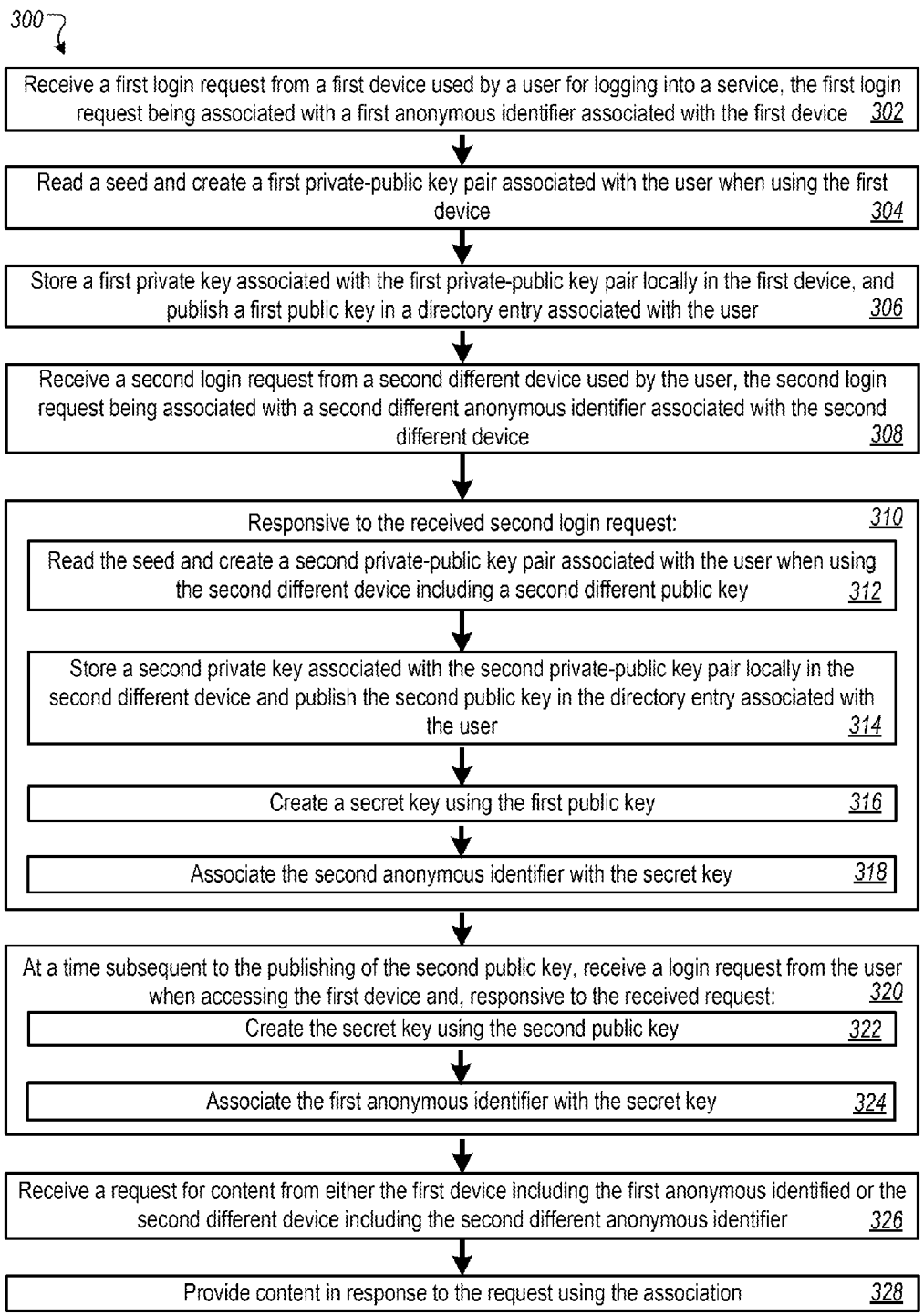
FIG. 3A is a flowchart of an example process for providing content to a user on any of multiple devices associated with the user.

FIG. 3A is a flowchart of an example process 300 for providing content to a user on any of multiple devices associated with the user. In some implementations, the content management system 110 and/or the user login service 120 can perform steps of the process 300 using instructions that are executed by one or more processors. FIGS. 1-2F are used to provide example structures for performing the steps of the process 300.

A first login request is received from a first device used by a user for logging into a service, the first login request being associated with a first anonymous identifier associated with the first device (302). For example, referring to FIG. 2A, the user login service 120 can receive the login request 208a from the first device 106a (e.g., a personal computer) being used by the user 202. The login request can be associated, for example, with the anonymous identifier 206a (e.g., "Device ID 1") that is associated with the first device 106a.

A seed is read, and a first private-public key pair is created that is associated with the user when using the first device (304). As an example, the user login service 120 can read the seed 212a (e.g., generator-prime pair 7, 11) and provide the seed 212a to the first device 106a. Using the seed, the first device 106a can determine the private key (e.g., 9) and the public key (e.g., 4) associated with first device 106a.

A first private key associated with the first private-public key pair is stored locally in the first device, and a first public key is published in a directory entry associated with the user (306). The first device 106a, for example, can store the private key in local storage 221a. The first device 106a can also provide the public key (e.g., 4) to the user login service 120 for storage in user login information 121.

A second login request is received from a second different device used by the user, the second login request being associated with a second different anonymous identifier associated with the second different device (308). As an example, referring to FIG. 2B, the same user 202 can log into the second different device (e.g., a laptop computer). The user login service 120, for example, can receive the login request 208b. The login request can be associated, for example, with the anonymous identifier 206b (e.g., "Device ID 2") that is associated with the second different device 106b.

Responsive to the received second login request (310), the seed is read, and a second private-public key pair is created that is associated with the user when using the second different device including a second different public key (312). As an example, the user login service 120 can read the seed 212a (e.g., generator-prime pair 7, 11) and provide the seed 212a to the second different device 106b. Using the seed, the second different device 106b can determine its private key (e.g., 6) and the public key (e.g., 8).

A second private key associated with the second private-public key pair is stored locally in the second different device, and the second public key is published in the directory entry associated with the user (314). The second different device 106b, for example, can store the private key in local storage 221b. The second different device 106b can also provide the public key (e.g., 8) to the user login service 120 for storage in user login information 121.

A secret key is created using the first public key (316). For example, referring to FIG. 2C, the second different device 106b can compute the secret key 230a (e.g., 3) using the public key (e.g., 4) from the first device and the second different device's own private key (e.g., 6). Device B calculations 252 shown in FIG. 2F provide example steps and formulas for computing the secret key.

The second anonymous identifier is associated with the secret key (318). For example, the second different anonymous identifier (e.g., Device ID 2) can be stored with the secret key (e.g., a hashed version), e.g., in the linked anonymous identifiers 122, which is stored separately from the user login information 121.

At a time subsequent to the publishing of the second public key, a login request is received from the user when accessing the first device (320) and, responsive to the received request, the secret key is created using the second public key (322). As an example, the user 202 can log back into the first device 106a. The login request 208a, for example, can be received by the user login service 120. At this time, the first device 106a can also compute the secret key 3 using the first device's private key (e.g., 9) and the public key (e.g., 8) from the second different device 106b. Device A calculations 250 shown in FIG. 2F provide example steps and formulas for computing the secret key.

The first anonymous identifier is associated with the secret key (324). For example, the first anonymous identifier (e.g., Device ID 1) can be stored with hashed version of the secret key in the linked anonymous identifiers 122. As a result, both anonymous identifiers are now linked. For example, the secret key, the first anonymous identifier, and the second different anonymous identifier are stored as an entry in a table, e.g., row 234. In some implementations, the association maps the secret key to both the first and the second different anonymous identifiers. In some implementations, one or more associations can be removed (e.g., deleted from the linked anonymous identifiers 122) after expiration of a first time period (e.g., 24 hours, 48 hours, or some other time period). In some implementations, the time period can be associated with an amount of time after which the user would have been expected to have logged out from either the first device or the second different device.

A request for content is received from either the first device including the first anonymous identifier or the second different device including the second different anonymous identifier (326). In one example, referring to FIG. 2E, the content management system 110 can receive, from the first device 106a, the request for content 240a that includes the anonymous identifier Device ID 1. In another example, the content management system 110 can receive, from the second different device 106b, the request for content 240b that includes the anonymous identifier Device ID 2.

Content is provided in response to the request using the association (328). For example, depending on which device sent the request for content 240a or 240b, the content management system 110 can provide content items 246a or 246b to either the first device 106a or the second different device 106b, respectively.

In some implementations, providing content in response to the request can further include identifying the user based on the association and providing content of interest to the user. For example, information (e.g., an interest in sports) that the user has provided in a user profile (or other information provided by and/or known about the user) can be used to select content which is likely of interest to the user.

Some implementations of the process 300 can include steps for linking additional devices, e.g., a third device and/or additional devices. For example, a login request can be received from a third different device used by the user, the login request being associated with a third different anonymous identifier associated with the third different device. A third different public-private key pair can be created, including a third public key. The third private key can be stored locally on the third different device, and the third public key can be published (e.g., in the user login information 121). A secret key can be created using one of either the first public key or the second public key, in addition to the third different device's private key, e.g., using steps and formulas shown in FIG. 2F. An association between the secret key, the first anonymous identifier, the second different anonymous identifier and the third different anonymous identifier can be stored, e.g., in the linked anonymous identifiers 122. Subsequently, a request for content can be received from either the first device including the first anonymous identifier, the second different device including the second different anonymous identifier, or the third different device including the third different anonymous identifier. In response to request, content (e.g., content items 246a or 246b, or content items for the third different device) can be provided using the association.

FIG. 3B is a flowchart of an example process 340 for providing content to a user on any of multiple linked devices associated with the user. In some implementations, the content management system 110 and/or the user login service 120 can perform steps of the process 340 using instructions that are executed by one or more processors. FIGS. 1-2F are used to provide example structures for performing the steps of the process 340.

Multiple anonymous identifiers associated with a user are linked by a service using a key exchange protocol without storing personally identifiable information associated with the user in the linking (342). For example, anonymous identifiers (e.g., browser cookies, or Device IDs 1 and 2) of the first device 106a and the second different device 106b, respectively, can be linked by the user login service 120. The linking, for example, can occur using key exchange techniques described above, including using public, private and secret key calculations shown in FIG. 2E. In some implementations, public keys can be published on the user login service 120, private keys can be stored on the corresponding local device, and secret keys can be stored in a third location (e.g., linked anonymous identifiers 122). Other techniques can be used to link the devices, and more than two devices can be linked.

In some implementations, linking multiple anonymous identifiers can include receiving a login request (e.g., login requests 208a or 208b) from the user from plural different devices, determining a secret key using published public key information from another device associated with the user (where the secret key does not include any personally identifiable information associated with the user) and mapping the secret key to an anonymous identifier associated with each login request. For example, the secret key can be a secret key stored in the linked anonymous identifiers 122, which does not include information about the user that can be traced back to the user (i.e., without having access to the information from the user login information 121, the linked anonymous identifiers 122, and private keys stored on the various user devices).

In some implementations, determining the secret key can include, at each device, creating a public-private key pair, publishing a public key of the public-private key pair, and using a private key of the public-private key pair and a public key of another device to compute the secret key.

Requests for content from a client device associated with the user are received at the service, where each request includes one of the anonymous identifiers (344). For example, referring to FIG. 2E, the content management system 110 can receive the request for content 240a that includes the anonymous identifier Device ID 1 corresponding to the first device 106a. In another example, the content management system 110 can receive the request for content 240b that includes the anonymous identifier Device ID 2 corresponding to the second different device 106b.

Content associated with the user is provided that is responsive to the received requests and based on the linking (346). For example, the content management system 110 can provide content items 246a or 246b to either the first device 106a or the second different device 106b, respectively, depending on which device sent the request for content 240a or 240b.

FIG. 3C is a flowchart of an example process 360 for providing content to a user on any of multiple devices linked using public-private keys. In some implementations, the content management system 110 and/or the user login service 120 can perform steps of the process 360 using instructions that are executed by one or more processors. FIGS. 1-2F are used to provide example structures for performing the steps of the process 360.

Public-private key pairs are created for a user each time the user logs into a service from a different device including publishing respective public keys of the user in a directory entry associated with the user (362). For example, FIGS. 2A-2D show a sequence of actions that use public-private key pairs to link the first device 106a and the second different device 106b. The public keys in this example are stored in the user login information 121.

A secret key is created by each device using a public key of another device that is stored in the directory (364). For example, FIGS. 2C-2D show a sequence of actions that determine the secret key for each of the first device 106a and the second different device 106b using the public key of the other device.

The secret keys are associated with a plurality of anonymous identifiers, each anonymous identifier assigned to the user during a session associated with a respective different device (366). As an example, the secret key is stored in the linked anonymous identifiers 122. Steps and formulas for computing the secret keys are shown in FIG. 2E.

Content is provided that is associated with the user and based at least in part on the association (368). For example, depending on which device sent the request for content 240a or 240b, the content management system 110 can provide content items 246a or 246b to either the first device 106a or the second different device 106b, respectively.

Figure 3D:
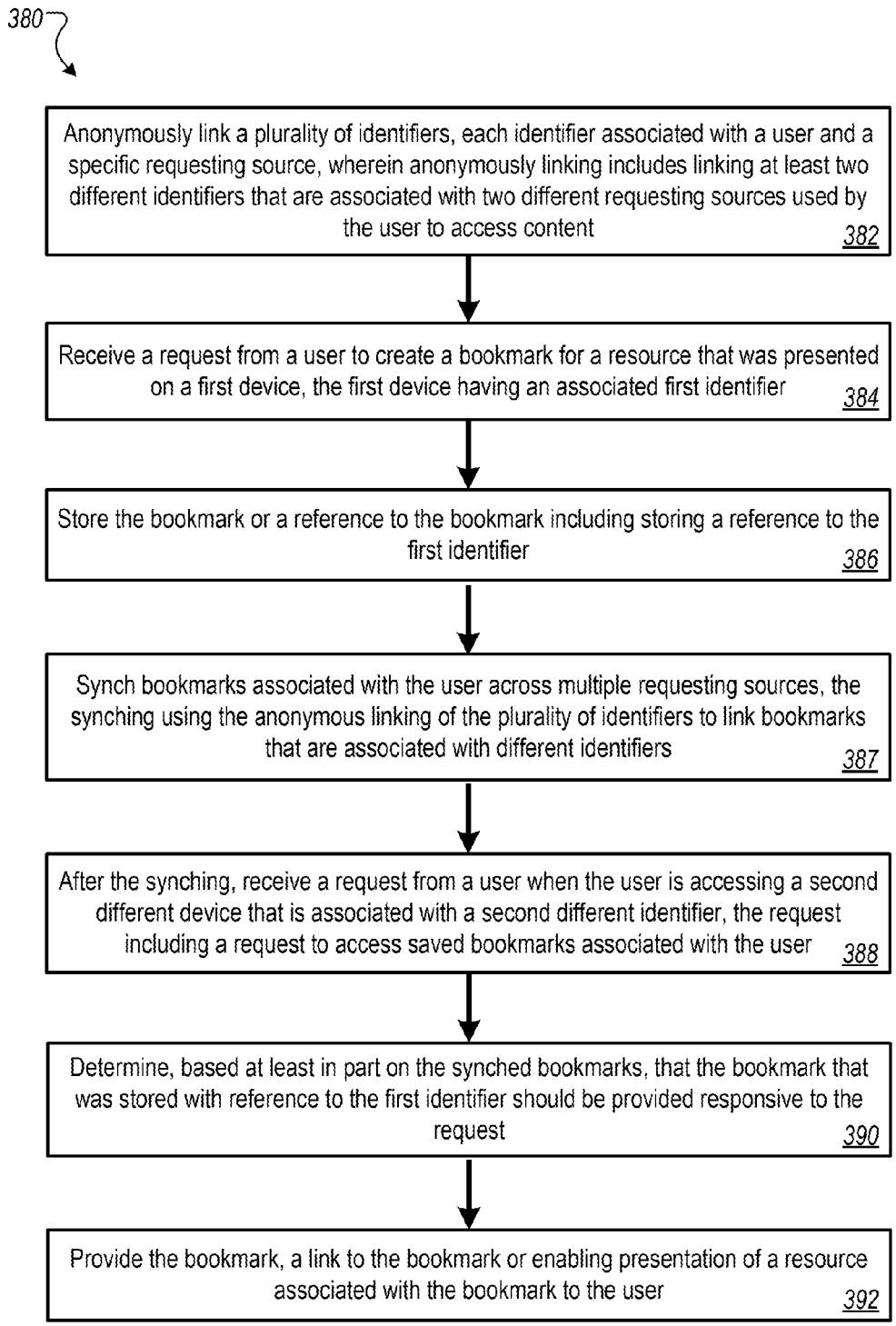
FIG. 3D is a flowchart of an example process for saving and using content across multiple linked requesting sources associated with a user.

FIG. 3D is a flowchart of an example process 380 for saving and using content across multiple linked requesting sources associated with a user. In some implementations, the content management system 110 and/or the user login service 120 can perform steps of the process 380 using instructions that are executed by one or more processors. FIGS. 1-2G are referenced as example structures/interfaces associated with the steps of the process 380. As described above, in some implementations, using anonymously linked requesting sources to save and re-call content across multiple linked requesting sources associated with a user may occur when permitted by the user, e.g., based on settings in the user consents and privacy preferences 142.

A plurality of identifiers are anonymously linked (382). Each identifier is associated with a user and a specific requesting source. The anonymously linking includes linking at least two different identifiers that are associated with two different requesting sources used by the user to access content. Example requesting sources can include mobile devices (e.g., smart phone), laptop computers, tablets, desktop devices, set-top boxes, televisions, browser, applications on a mobile device, or stand-alone applications. In some implementations, the linking can occur without requiring the user to log into either requesting source. In some implementations, the anonymously linking can include linking the two different identifiers using an identifier that does not include any personally identifiable information. For example, the identifiers associated with the user's requesting sources, such as mobile and non-mobile devices, can be linked anonymously, as described above with reference to FIGS. 2A-2F. Other ways of linking a user's requesting sources can be used.

A request is received from a user to create a bookmark for a resource that was presented on a first device having an associated first identifier (384). For example, the resource can be the web page 244a, the advertisement 273 or the coupon 275 that has been presented to the user 202 on the first device 106a (e.g., a mobile device).

In some implementations, the request to create the bookmark can include receiving input from a control associated with a browser or other interaction with content presented in the browser (such as an advertisement). For example, the request can be initiated when the user selects the bookmark control 271, e.g., to bookmark the web page 244a. In another example, the request can be initiated when the user selects the save control 272 to save the advertisement 273, or when the user selects the save control 274 to save the coupon 275.

In some implementations, other types of controls can be used and/or labeled in other ways, e.g., "save for later." In some implementations, content can be saved automatically, e.g., so that bookmarks for web pages and references to advertisements and coupons are automatically available on all of the linked requesting sources associated with a user.

The bookmark is stored, or a reference to the bookmark is stored, including storing a reference to the first identifier (386). For example, the content management system 110 can store the bookmark or a reference to the bookmark in the stored bookmarks 123.

Bookmarks associated with the user are synched across multiple requesting sources (387). The synching uses the anonymous linking of the plurality of identifiers to link bookmarks that are associated with different identifiers. For example, the content management system 110 can synch the bookmark associated with the advertisement 273 so that the bookmark is available on the first device 106a and second different device 106b and any other of the user's requesting sources. In some implementations, the synching does not require an explicit user account creation or a user login step.

In some implementations, after or coincident with the synching, a request is received from a user when the user is accessing a second different device that is associated with a second different identifier (388). The request includes a request to access saved bookmarks associated with the user. In some implementations, the request can include the second identifier, e.g., the anonymous identifier of the user's non-mobile device that is anonymously linked to the user's mobile device. For example, the request can include a request received from the user using a control to access the saved content item, such as the control 281 to access saved bookmarks for resources (e.g., the web page 244a), the control 282 to access saved advertisements (e.g., the advertisement 273), or the control 283 to access saved coupons (e.g., the saved coupon 275). Other types of requests and controls corresponding to other types of content can also be received.

Based at least in part on the synched bookmarks, a determination is made that the bookmark that was stored with reference to the first identifier should be provided responsive to the request (390). For example, the content management system 110 can identify the specific content item (e.g., web page, advertisement, coupon, etc.) that should be provided in response to the user selecting one of the controls 281, 282 or 284. The identifier associated with the request can be mapped to other identifiers based on linked anonymous identifiers 122.

The bookmark or a link to the bookmark is provided, or presentation of a resource associated with the bookmark to the user is enabled (392). For example, the content management system 110 can provide the requested web page, advertisement or coupon, e.g., in the form of a resource, link or other reference.

Figure 4:
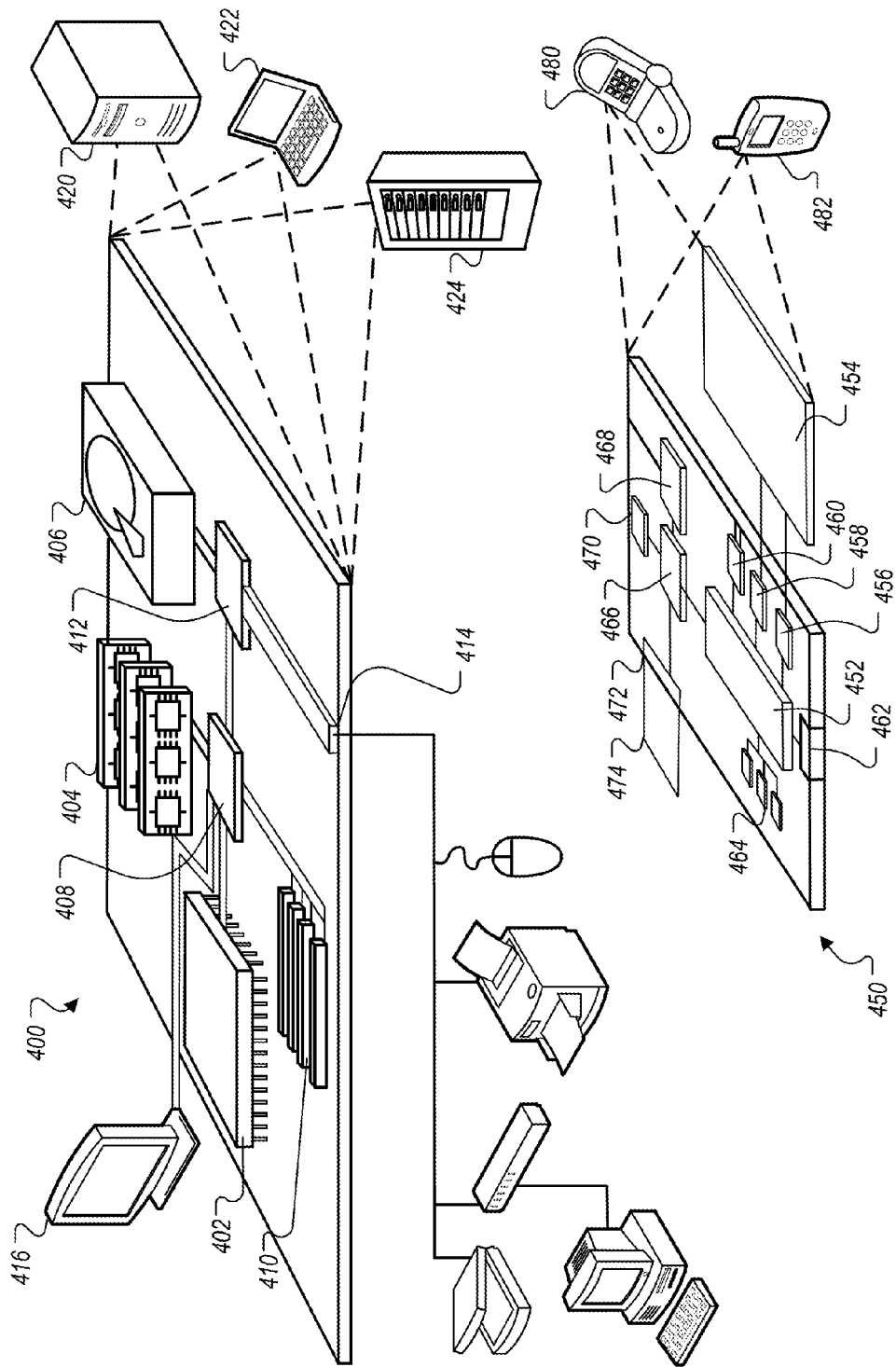
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
anonymously linking a plurality of identifiers, each identifier associated with a user and a specific requesting source, wherein the anonymously linking includes linking at least two different identifiers that are associated with two different requesting sources used by the user to access content, and wherein the anonymous linking uses a one-way encoding function that prevents identification of the user using the anonymous linking;
receiving a save request from the user to create a bookmark for a resource that was presented on a first device, the first device having an associated first identifier;
storing the bookmark or a reference to the bookmark including storing a reference to the first identifier;
synching bookmarks associated with the user across multiple requesting sources, wherein the synching uses the anonymous linking of the plurality of identifiers to link bookmarks that are associated with different identifiers;
after the synching, receiving a second request from the user when the user is accessing a second different device that is associated with a second different identifier, the second request including an access request to access saved bookmarks associated with the user;
determining that the bookmark that was stored with reference to the first identifier should be provided responsive to the access request based at least in part on the synched bookmarks; and
providing the bookmark, a link to the bookmark or enabling presentation of a resource associated with the bookmark to the user.

2. The method of claim 1 wherein the bookmark is associated with an advertisement or a coupon.

3. The method of claim 1 wherein the first device is a mobile device and the second device is a non-mobile device.

4. The method of claim 1 wherein the content is a bookmark of a webpage.

5. The method of claim 1 wherein the access request includes the second identifier.

6. The method of claim 1 wherein the two different requesting sources are selected from the group comprising: a mobile device including a smart phone, a laptop computer, a tablet, a desktop device, a set-top box, a television, a browser, an application on a mobile device, or a stand-alone application.

7. The method of claim 1 wherein receiving the request to create the bookmark includes receiving input from a control associated with an advertisement, the input indicating that the advertisement is to be saved.

8. The method of claim 7 wherein receiving the request to access saved bookmarks includes receiving a request to access the saved advertisement.

9. The method of claim 1 wherein the anonymous linking occurs without requiring the user to log into either requesting source.

10. The method of claim 1 wherein anonymously linking includes linking identifiers using a Diffie-Hellman key exchange protocol.

11. The method of claim 1 wherein anonymously linking includes linking identifiers using a secret key derived from a seed that is unique to the user.

12. The method of claim 1 wherein synching does not require an explicit user account creation or a user login step.

13. A computer program product embodied in a non-transitory tangible medium including instructions, that when executed, cause one or more processors to:
anonymously link a plurality of identifiers, each identifier associated with a user and a specific requesting source, wherein the anonymously linking includes linking at least two different identifiers that are associated with two different requesting sources used by the user to access content, and wherein the anonymous linking uses a one-way encoding function that prevents identification of the user using the anonymous linking;
receive a save request from the user to create a bookmark for a resource that was presented on a first device, the first device having an associated first identifier;
store the bookmark or a reference to the bookmark including storing a reference to the first identifier;
synch bookmarks associated with the user across multiple requesting sources, wherein the synching uses the anonymous linking of the plurality of identifiers to link bookmarks that are associated with different identifiers;
after the synching, receive a second request from the user when the user is accessing a second different device that is associated with a second different identifier, the second request including an access request to access saved bookmarks associated with the user;
determine that the bookmark that was stored with reference to the first identifier should be provided responsive to the access request based at least in part on the synched bookmarks; and
provide the bookmark, a link to the bookmark or enable presentation of a resource associated with the bookmark to the user.

14. The computer program product of claim 13 wherein the bookmark is associated with an advertisement or a coupon.

15. The computer program product of claim 13 wherein the first device is a mobile device and the second device is a non-mobile device.

16. The computer program product of claim 13 wherein the content is a bookmark of a webpage.

17. The computer program product of claim 13 wherein anonymously linking includes linking identifiers using a Diffie-Hellman key exchange protocol.

18. The computer program product of claim 13 wherein anonymously linking includes linking identifiers using a secret key derived from a seed that is unique to the user.

19. The computer program product of claim 13 wherein synching does not require an explicit user account creation or a user login step.

20. A system comprising:
one or more processors; and
one or more memory elements including instructions that when executed cause the one or more processors to:
anonymously link a plurality of identifiers, each identifier associated with a user and a specific requesting source, wherein the anonymously linking includes linking at least two different identifiers that are associated with two different requesting sources used by the user to access content, and wherein the anonymous linking uses a one-way encoding function that prevents identification of the user using the anonymous linking;

receive a save request from the user to create a bookmark for a resource that was presented on a first device, the first device having an associated first identifier;

store the bookmark or a reference to the bookmark including storing a reference to the first identifier;

synch bookmarks associated with the user across multiple requesting sources, wherein the synching uses the anonymous linking of the plurality of identifiers to link bookmarks that are associated with different identifiers;

after the synching, receive a second request from the user when the user is accessing a second different device that is associated with a second different identifier, the second request including an access request to access saved bookmarks associated with the user;

determine that the bookmark that was stored with reference to the first identifier should be provided responsive to the access request based at least in part on the synched bookmarks; and provide the bookmark, a link to the bookmark or enable presentation of a resource associated with the bookmark to the user.

* * * * *